(12) United States Patent
Liao et al.

(10) Patent No.: US 8,717,947 B2
(45) Date of Patent: May 6, 2014

(54) METHODS AND DEVICES FOR SPATIAL CODING

(75) Inventors: Jingyi Liao, Solna (SE); Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 224 days.

(21) Appl. No.: 13/060,201

(22) PCT Filed: Sep. 12, 2008

(86) PCT No.: PCT/SE2008/051024
§ 371 (c)(1),
(2), (4) Date: Feb. 22, 2011

(87) PCT Pub. No.: WO2010/030213
PCT Pub. Date: Mar. 18, 2010

(65) Prior Publication Data
US 2011/0164697 A1    Jul. 7, 2011

(51) Int. Cl.
*H04L 12/16* (2006.01)
(52) U.S. Cl.
USPC .......................... 370/260; 370/329; 375/267
(58) Field of Classification Search
None
See application file for complete search history.

(56) References Cited

U.S. PATENT DOCUMENTS

| 2005/0048980 | A1 | 3/2005 | Kumar | |
|---|---|---|---|---|
| 2008/0130769 | A1 | 6/2008 | Papadopoulos | |
| 2009/0180561 | A1* | 7/2009 | Kim et al. | 375/260 |
| 2009/0202016 | A1* | 8/2009 | Seong et al. | 375/267 |
| 2010/0284484 | A1* | 11/2010 | Jongren et al. | 375/267 |

FOREIGN PATENT DOCUMENTS

| EP | 1 511 333 | 3/2005 |
|---|---|---|
| WO | 2008/066888 | 6/2008 |

OTHER PUBLICATIONS

3GPP TS 36.211 V1.1.0 (May 2007) 3rd Generation Partnership Project; Technical Specification Group Radio Access Network; Physical Channels and Modulation (Release 8).
International Search Report for PCT/SE2008/051024, mailed Jul. 9, 2009.
International Preliminary Report on Patentability and Written Opinion issued in Application No. PCT/SE2008/051024 dated Mar. 15, 2011.

\* cited by examiner

*Primary Examiner* — Ricky Ngo
*Assistant Examiner* — Iqbal Zaidi
(74) *Attorney, Agent, or Firm* — Nixon & Vanderhye, P.C.

(57) ABSTRACT

Embodiments of the invention relates to a method in a controller node for distributing code text of a joint spatial coding in a communications network. The communications network comprises at least two communication nodes each comprising at least one transmit antenna. The method comprises to joint spatial code (12, S11) a symbol resulting in at least a first code text and a second code text. Then, the method comprises to group (T4, S12) the transmit antennas in the communications network into at least a first transmit antenna group and a second transmit antenna group based on the location of coverage area of the transmit antennas. Finally, the method comprises to distribute (T6) the first code text to the first transmit antenna group and the second code text to the second transmit antenna group. The invention is particularly useful for transmission in Multimedia Broadcast Single Frequency Network (MBSFN) comprising of communication nodes equipped with unequal number of transmit antennas. Embodiments also relates to a controller node, a second communication node, a user equipment and methods therein.

30 Claims, 15 Drawing Sheets encoded symbols for ant. group 1 and group 2.

METHODS AND DEVICES FOR SPATIAL CODING

This application is the U.S. national phase of International Application No. PCT/SE2008/051024, filed 12 Sep. 2008, which designated the U.S., the entire contents of which is hereby incorporated by reference.

TECHNICAL FIELD

The invention relates to methods and communication nodes in a communications network, in particular, for signaling joint spatial coding data to communication nodes within a communications network.

BACKGROUND

There are today networks/services that provide ways to enhance the bandwidth capacity. Multimedia Broadcast and Multicast Service, MBMS, introduced by 3GPP in Release 6 is intended to efficiently use network/radio resources by transmitting data over a common radio channel, both in the core network and, most importantly, in the air interface of UTRAN, UMTS Terrestrial Radio Access Network. MBMS is targeting high (variable) bit rate services over a common channel. One of the most important properties of MBMS is resource sharing among many User Equipments, UEs, meaning that many users should be able to listen to the same MBMS channel at the same time. The MBMS is also introduced in E-UTRAN, where MBMS transmissions may be performed in the single-cell transmission and Multimedia Broadcast Single Frequency Network, MBSFN, i.e. multi-cell transmission, types. In case of MBSFN, the cells and content are synchronized to enable the terminal to combine the energy from multiple transmissions.

Multiple Input Multiple Output (MIMO) is a known advanced antenna techniques. MIMO implies that both a base station and a UE have multiple antennas. MIMO provides different spatial processing which has the potential to contribute significantly to improve spectral efficiency, diversity, coverage, interference mitigation, etc. In E-UTRA MBMS, the potential candidates for MIMO are either an open-loop transmission diversity scheme, an open-loop spatial multiplexing approach or a hybrid combination of both.

The spatial diversity transmission technologies have been employed in MBMS system. The spatial diversity transmission may be envisaged in various forms such as macro-diversity and combination of the signals from the diverse transmissions.

In MBSFN, macro-diversity inherently exists in cellular systems when the same stream containing data and/or control information is provided from the adjacent cells. However, in order to take advantage of this form of diversity, a mechanism is needed to combine the signals from the diverse transmissions.

Prior-art proposals for maximum-ratio combining (MRC) and selection combining (SC) exist. The MRC technique is known to provide the best performance but severely constrains the relative transmission delays between the cells. Selection combining, on the other hand, relaxes the delay constraint at the expense of a performance loss. The applications of multiple transmit antenna technologies to MBMS network such as space time block coding (STBC) and MIMO are introduced. STBC is a technique used in wireless communications to transmit multiple copies of a data stream across a number of antennas and to exploit the various received versions of the data to improve the reliability of data transfer. MIMO is used in order to enhance the capacity and throughput without any further increase in the transmission bandwidth. It should also be understood that the usage of unicast services using spatial coding also enhances the transmission capacity.

The spatial processes, such as STBC or the like, or temporal diversity schemes, such as time switch diversity coding and MIMO can be contained in one generic structure. These spatial processes, and the potential adaptation spatial processing between (or among) the different spatial processing are termed as spatial coding in this document. However, spatial coding techniques are limited to the antenna setup and application scenarios.

SUMMARY

It is a desire of embodiments herein to provide transmission gain of spatial coding in a communications network.

Embodiments relates to a method in a controller node for distributing code text of a joint spatial coding in a communications network. The communications network comprises at least two communication nodes each comprising at least one transmit antenna. The method comprises to joint spatial code a symbol resulting in at least a first code text and a second code text. Then, the method comprises to group the transmit antennas in the communications network into at least a first transmit antenna group and a second transmit antenna group based on a location of coverage area of the transmit antennas. Additionally, the method comprises to distribute the first code text to the first transmit antenna group and the second code text to the second transmit antenna group.

Embodiments disclose a controller node arranged, in a communications network comprising at least two communication nodes each comprising at least one transmit antenna, to distribute code texts of a joint spatial coding to the nodes. The controller node comprises a control unit arranged to joint spatial code a symbol into at least a first code text and a second code text. The control unit is furthermore arranged to group the transmit antennas in the communications network into at least a first transmit antenna group and a second transmit antenna group based on a location of coverage area of the transmit antennas. The controller node further comprises a network interface configured to distribute the first code text to the first transmit antenna group and the second code text to the second transmit antenna group.

Embodiments disclose a method in a second communication node within a communications network. The method comprises to receive from a controller node a first code text of a joint spatial coding based on a location of coverage area of the transmit antennas, and to distribute the first code text to a user equipment within a cell of a first transmit antenna of the second communication node.

Embodiments disclose a second communication node arranged, in a communications network comprising at least two communication nodes each comprising at least one transmit antenna, to set up operational setting of a joint spatial coding within the communications network. The second communication node comprises a network interface arranged to receive from a controller node a first code text of a joint spatial coding based on a location of coverage of the transmit antennas. The second communications network comprises a control unit arranged to distribute through a first transmitting arrangement the first code text to a user equipment within a cell of the first transmitting arrangement.

In addition, embodiments disclose a method in a user equipment within a communications network comprising at least two communication nodes each comprising at least one transmit antenna for selecting an operational setup using a code text of a joint spatial coding. The method comprises to receive a first signal with a first code text from a second communication node and a second signal with a second code text from a third communication node. Furthermore, the method comprises the step of evaluating the first and second signal and based on the evaluation selecting signal. Furthermore, the method comprises to transmit feedback to the second communication node indicating the selection.

Additionally, embodiments disclose a user equipment. The user equipment is arranged, in a communications network comprising at least two communication nodes each comprising at least one transmit antenna, to select an operational setup using a code text of a joint spatial coding. Furthermore, the user equipment comprises a receiving arrangement configured to receive a first signal with a first code text from a second communication node and a second signal with a second code text from a third communication node. The user equipment also comprises a control unit arranged to evaluate the signals and based on the evaluation to select signal and to create feedback data indicating the selection. In addition, the user equipment comprises a transmitting arrangement configured to transmit the feedback data to the second communication node.

Embodiments disclose ways to provide transmission gain of spatial coding in a communications network.

BRIEF DESCRIPTION OF THE DRAWINGS

Embodiments will now be described in more detail in relation to the enclosed drawings, in which.

DETAILED DESCRIPTION OF EMBODIMENTS

Figure 1:
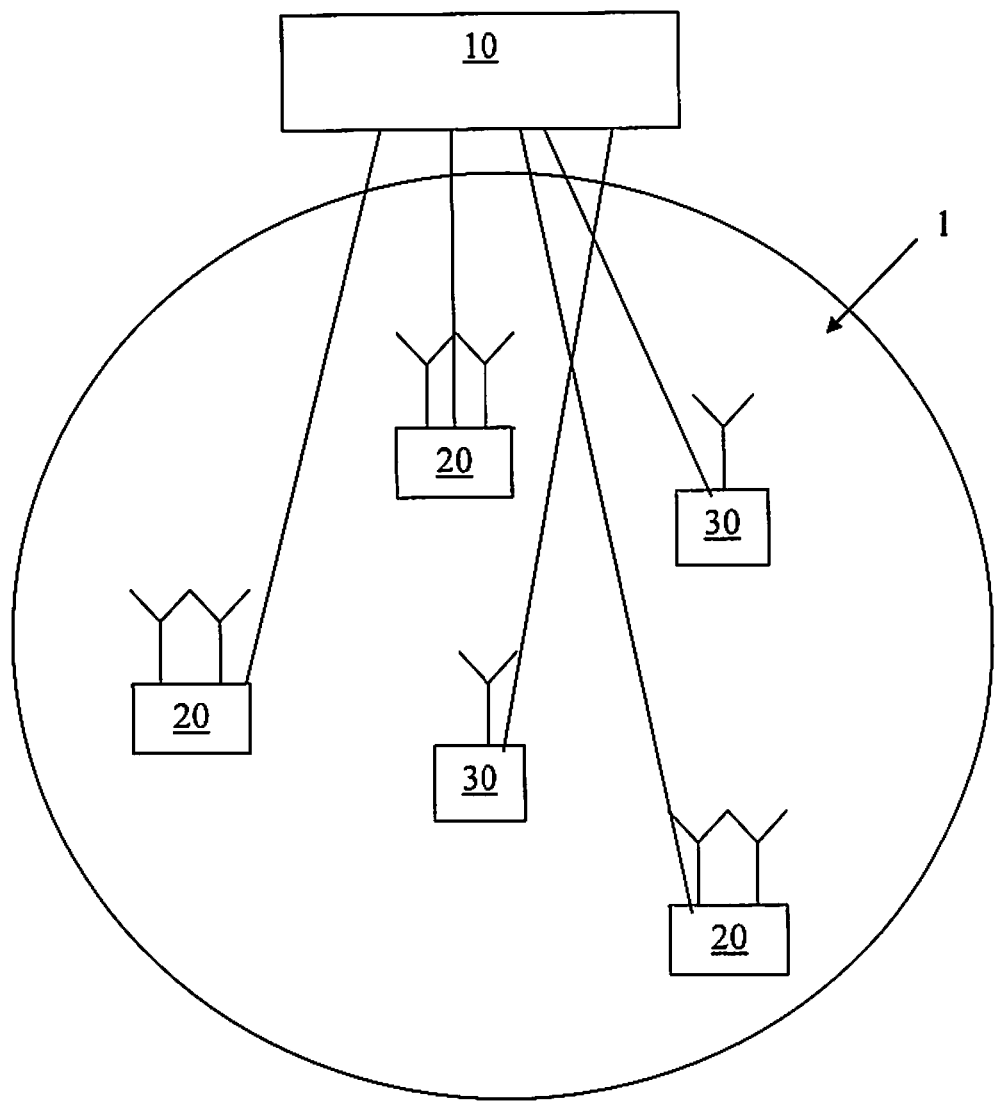
FIG. 1 shows a schematic overview of a communications network.

The present invention will now be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

Embodiments according to the present invention are described with reference to block diagrams and/or operational illustrations of methods and communication nodes. In this regard, each block may represent a module, segment, or portion of code, which comprises one or more executable instructions for implementing the specified logical function (s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a control unit, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

A memory unit may be a separate memory device or a plurality of separated memory devices.

Throughout the specification, a controller node comprise a Operation and Maintenance Node, eNodeB, base station controller (BSC), radio network controller (RNC), Mobility Management Entity (MME), or the like.

A base station (BS) represents an access point (AP), a radio access station (RAS), a nodeB (Node-B), an evolved Node-B (eNB), a base transceiver station (BTS), a mobile multihop relay (MMR)-BS1 and/or the like, and includes entire or partial functions of the AP, RAS, Node-B, eNB, BTS, and MMR-BS.

It should be understood that the controller node and base station may be a combined node such as a eNodeB, or the like.

User equipment (UE) represents a terminal, a mobile terminal (MT), a subscriber station (SS), a mobile station (MS), a portable subscriber station (PSS), an access terminal (AT), and/or the like, and includes entire or partial functions of the terminal, mobile terminal, subscriber station, portable subscriber station, mobile station, and access terminal.

In FIG. 1, a schematic overview of a communications network 1 is shown. A plurality of different configured base stations is housed within the communications network. A couple of first base stations 20 comprise two transmit antennas and a couple of second base stations 30 comprise one transmit antenna. The communications network further comprises a controller node 10 arranged to set up the different base stations 20, 30 to operational mode.

It should here be understood that the communications network may be a communications network that uses unicast, broadcast, multicast services. In the following description embodiments of an MBSFN are shown, however, the embodiments may be applicable to other networks and other services.

The unequal transmit antenna configuration implies that different NodeBs or cell sites have different number of transmit antennas and different spatial method capabilities.

In an unequal transmit antenna case for MBSFN transmission one possibility would be that each cell has its own transmission mode, i.e., the neighbor cell might have different transmission mode. For instance a cell with 1 Tx does not employ any spatial coding method whereas a neighbor cell with 2 Tx uses 2×2 MIMO. The major limitation of this type of deployment is that the full rank MIMO precoding mode is not possible in the entire SFN area. Another disadvantage is that the inter-cell interference may be large for the UE in the cell edge due to the different transmission mode in neighbor cells and the UE needs to reselect (or change) its MIMO mode if UE performs handover when it moves to another cell, which supports different antenna configuration. The MIMO mode switching is not desirable in MBSFN network, where full gain is achieved if UE is able to combine the signals based on the same spatial coding method is used in all the cells.

Another way is to employ the macro diversity so that all transmit antennas send the same spatial coding signals by which the reception quality can be enhanced by the combination of the signals from macro-diversity transmission at the UE. However, this lacks flexibility since it is not easy to extend this for other MIMO precoding usages, e.g. PARC and STBC mode. In other words the benefit and potential of MIMO will not be exploitable.

The likelihood of unequal transmit antenna configuration stems from the fact that the same MBSFN transmission would cover an entire city or even a province. Same transmit antennas are used for transmitting MBSFN and unicast services. Thus, an operator would prefer to deploy more transmit antennas in sites with denser traffic and fewer in remaining ones. Hence, typically MBSFN transmission spans very large coverage area comprising of hundreds of cells and an operator may decide to upgrade certain number of sites in future as traffic demands grow. Thus, another deployment may consists of sites with 2 and 4 transmit antennas and so on.

In FIG. 1, controller node 10 is arranged to apply the spatial antenna precoding in a multi-cellular multicast/broadcast system, deployed in a coverage area comprising of sites with a number of transmit antennas.

The controller 10 divides all the transmit antennas into different transmit antenna groups in the MBSFN area 1. A selected spatial channel coding scheme, e.g. STBC or the like, applies to all the transmit antenna groups in the entire MBSFN area. The "code text", which is the output of spatial coding, is distributed to all transmit antenna groups by a distributing function. One spatial code text is applied to one transmit antenna group and another spatial code text is applied to another transmit antenna group and so on.

In some embodiments, UEs may select their preferred code text/transmit antennas from the transmit antenna groups.

Further enhancement is that the same code text can be reused by different MBSFN areas since some selected transmit antennas in one area can be reused by the UEs in different adjacent MBSFN areas.

Figure 2:
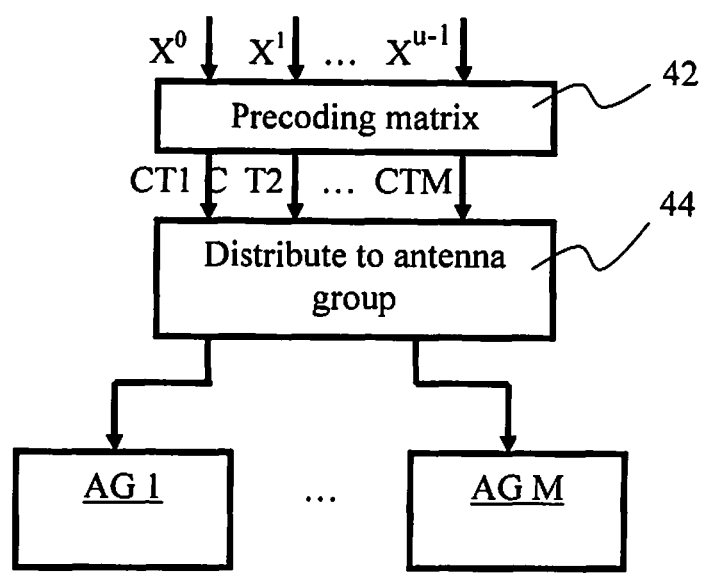
FIG. 2 shows a basic MIMO structure and a relevant spatial coding.

In FIG. 2, a basic MIMO structure and a relevant spatial coding which provides diversity or spatial multiplexing gain for MBSFN is shown. The joint spatial coding includes the precoding process, which is similar to the precoding structure in 3GPP TS 36.211, i.e. takes as input a block of vectors X-X from the layer mapping and generates a block of vectors to be mapped onto the radio resources, e.g. resource element in E-UTRAN or the like. But in an unequal transmit antenna configuration the output code texts CT1, CT2-CTM from the precoder will be jointly distributed 44 to the transmit antenna groups AG1-AGM as described below. UEs may select their best transmit antennas and feedback to network, and then the network regroup the transmit antenna groups within an MBSFN area.

Figure 3:
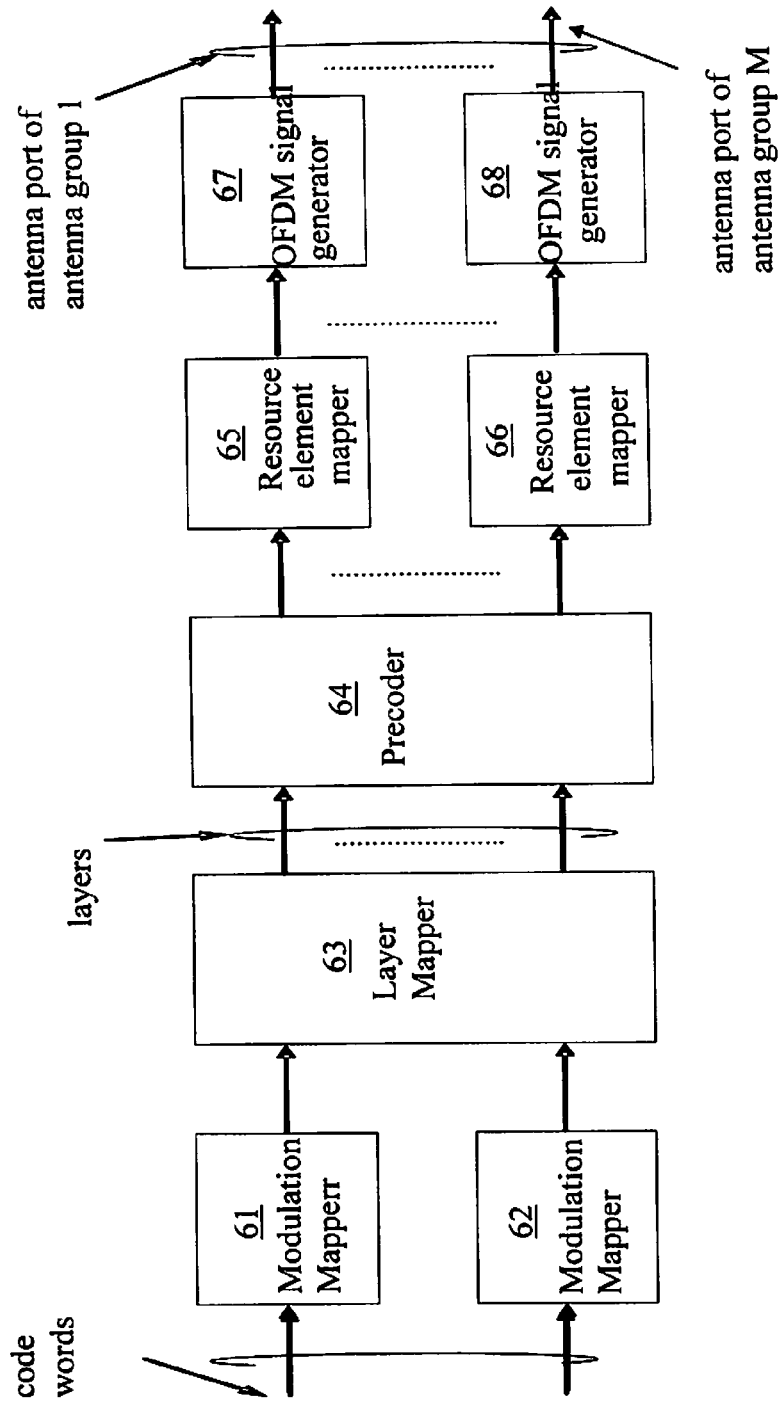
FIG. 3 shows a schematic overview of a modulation process in a base station.

In FIG. 3, a schematic overview of a modulation process in a base station is shown. Modulation symbols are created in modulation mappers 61, 62. The modulation symbols are mapped onto one or several transmission layers in layer mapper 63. Then precoding of the complex value modulation symbols on each layer for transmission on the transmit antenna ports is done in accordance to the received code texts from the controller in the precoder 64. Finally the mapping of symbols to resource elements is performed in the resource element mappers 65, 66 and generation of the time domain OFDM signal for each transmit antenna port is carried out in the OFDM signal generators 67, 68. Here the spatial precoder module takes as input a block of vectors from the layer mapping and generates a block of vectors to be mapped onto resources on each of the transmit antenna ports of the transmit antenna groups.

If all cell sites in the entire MBSFN area have the same transmit antenna configuration, i.e., equal number of transmit antennas, at every cell site within an MBSFN area, the precoding solution may easily be adopted. For example, the space time block code (STBC) is employed at all the sites in the MBSFN area.

Figure 4:
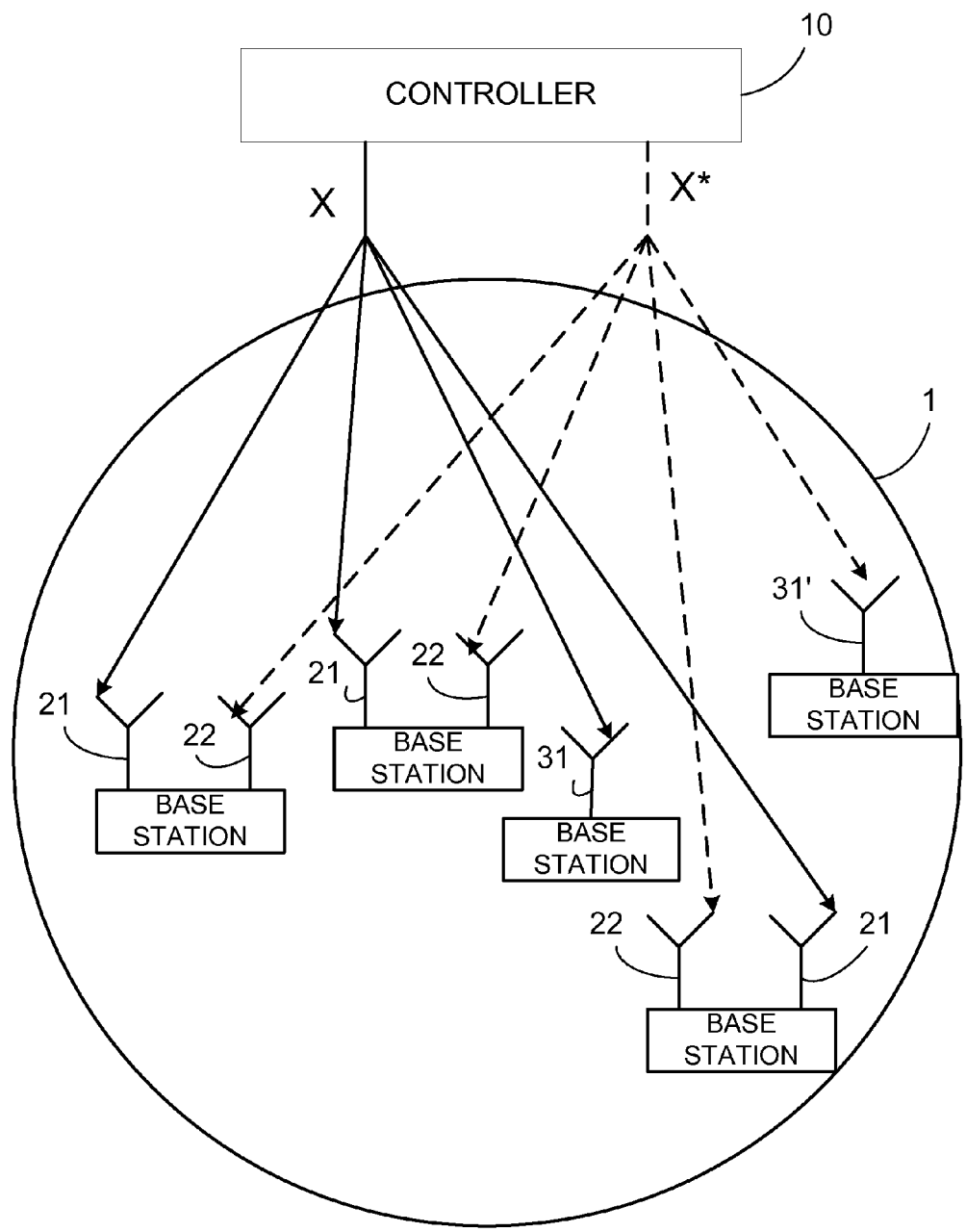
FIG. 4 shows a schematic overview of a communications network.

Embodiments disclose where the MIMO precoding is extended for the unequal transmit antenna configuration scenario in MBSFN network. Consider an unequal transmit antenna configuration in MBSFN area, i.e. where all cell sites don't have the same number of transmit antenna and spatial coding capabilities. The MIMO precoding may be solved with the precoding and code text distribution functions as shown in FIG. 4. The transmit antennas can then serve the entire MBSFN area using the same spatial technique even if certain cells have unequal transmit antennas.

In FIG. 4, a schematic overview of a communications network 1 with base stations of different transmit antenna configurations is shown. A controller node 10 is disclosed arranged to precode a symbol into a first code text X and a second code text X*. The controller node 10 is further arranged to group the transmit antennas 21, 22, 31 of the base stations within the communications network based on the location of the coverage of the transmit antennas. In the shown example, the controller node 10 groups the transmit antennas 21, 31 into a first group and distributes the code text X to the transmit antennas 21, 31. Furthermore, the controller node 10 groups transmit antennas 22 and 31' into a second group and distributes the second code text X* to the second group of transmit antennas. It should here be noted that the first and second code texts X, X* are distributed to alternating transmit antennas.

Figure 5:
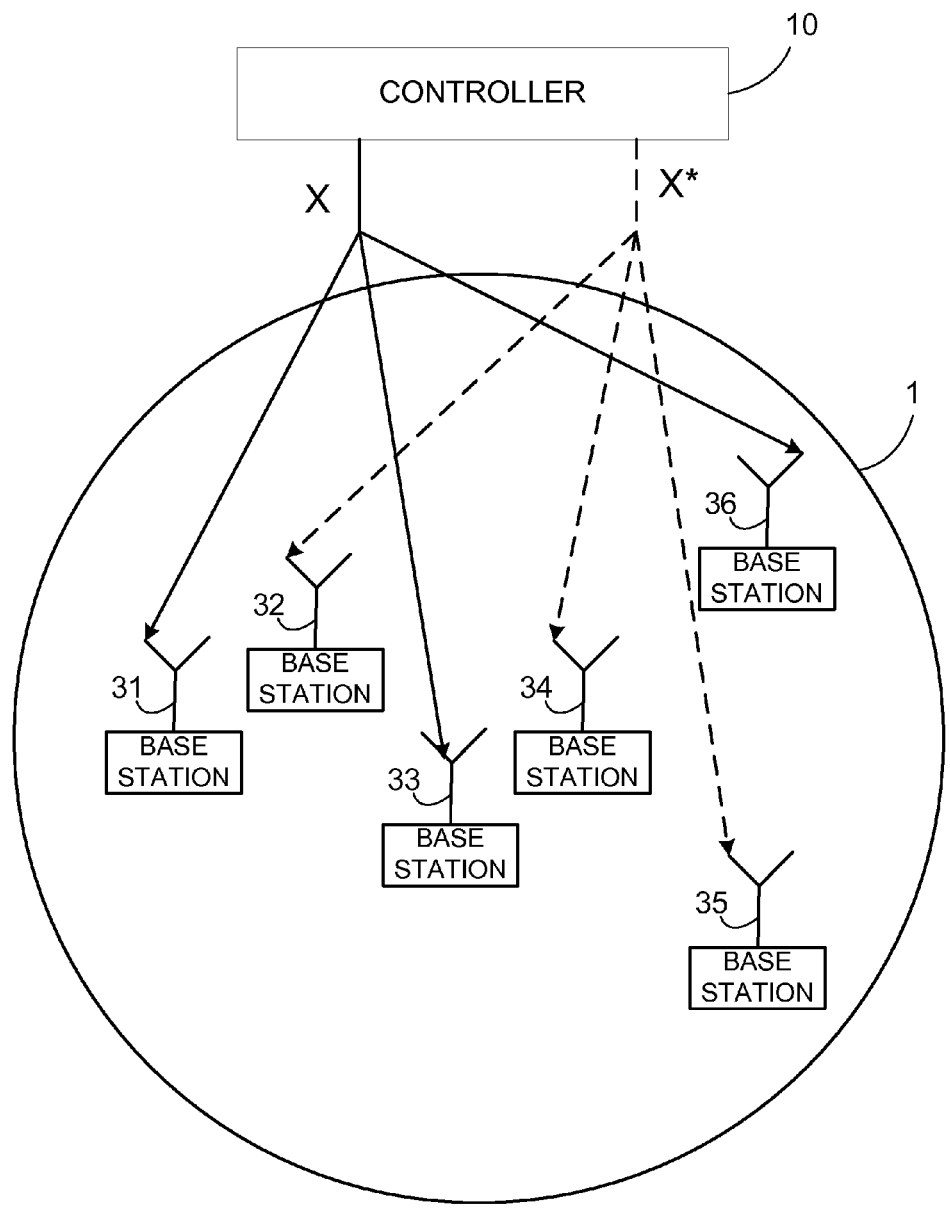
FIG. 5 shows a communications network where there is only one transmit antenna in each base station.

FIG. 5 shows a special case where there is only one transmit antenna in each site. The network controller node 10 use macro-diversity by distributing the code text comprising a real signal, denoted as X, and a complex conjugate of the code text, denoted as X*, to transmit antennas 31-36 in an alternating manner based on the location of the coverage of the transmit antennas. X is distributed to transmit antennas 31, 33, 36 and X* is distributed to transmit antennas 32, 34, 35. In this way, UEs within the network 1 will receive data from both channels in an optimal way, and the space time block coding can be implemented in an, for example, MBSFN area, wherein all base stations comprises single transmit antenna.

Figure 6:
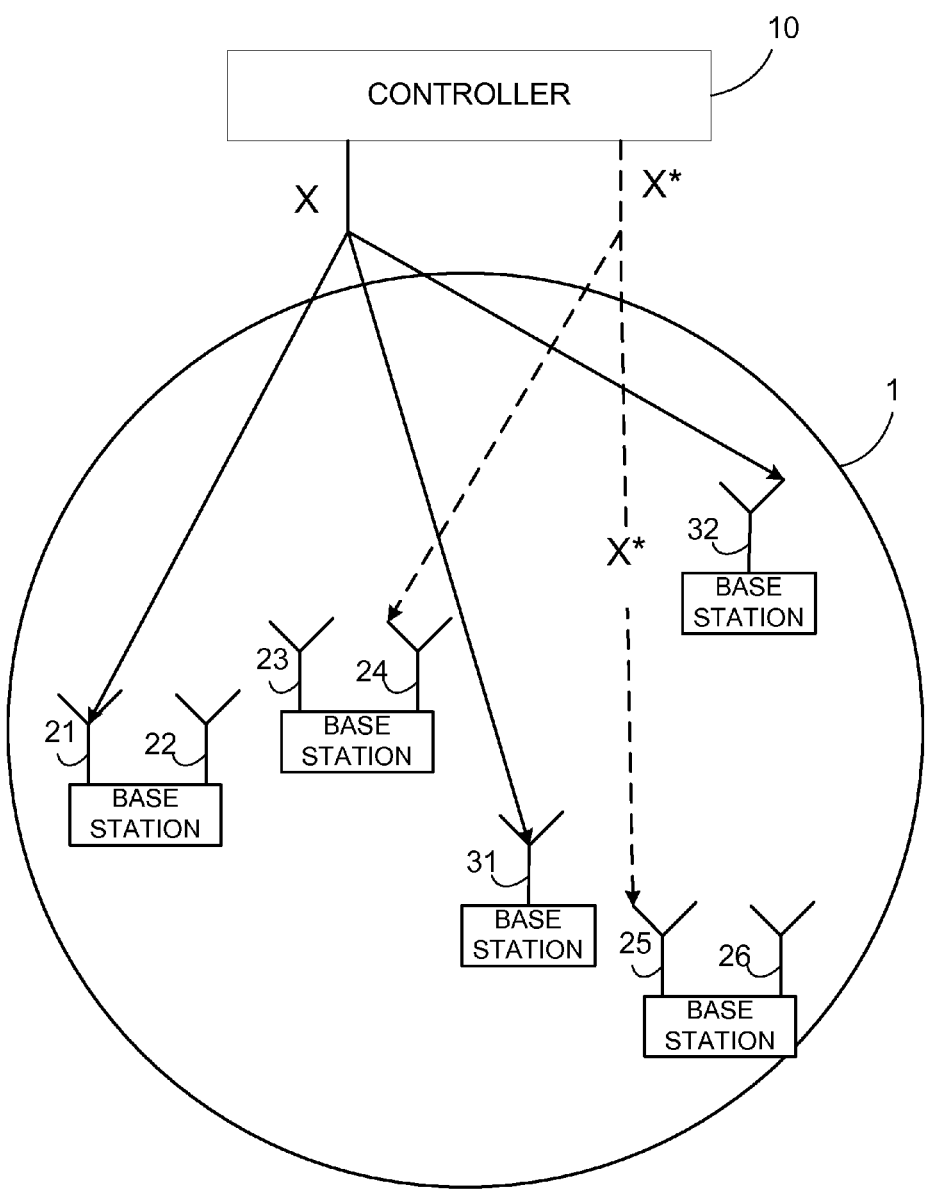
FIG. 6 shows a way of doing precoding in an unequal transmit antenna configuration scenario.

FIG. 6 shows another way of doing preceding in an unequal transmit antenna configuration scenario. A controller node 10 of the network is arranged to group transmit antennas 21-26 and 31-32 into a first and a second group based on the locations of the coverage of the transmit antennas. In fact, preceded code text of each group is transmitted via only one of the transmit antennas at each site even though some sites contain more than one transmit antenna. A suitable preceding scheme such as space time block coding can be used in the same way as used in FIG. 5. This means the signal X and its complex conjugate X* are sent via alternating transmit antennas; X via transmit antennas 21, 31, 32 of the first group and X* via transmit antennas 24, 25 of the second group.

In embodiments where there is large concentration of contiguous sites with one transmit antenna in one part of MBSFN area and another part of the same MBSFN area contains sites with multiple transmit antenna or combination of multiple and single transmit antennas. In such scenario it might not be feasible to use single transmit antenna configuration in the entire MBSFN area. Rather only one transmit antenna can be used for transmitting the precoded code text in one part of the MBSFN area where all or most sites contain single transmit antenna. On the other hand other part(s) of the MBSFN area where more sites have multiple transmit antennas, the scheme similar to the one shown in FIG. 4 may be employed.

The several spatial coding schemes, such as STBC and 2×2 PARC, Per Antenna Rate Control or the like, may be used in MBSFN deployment comprising of single transmit antenna and unequal transmit antenna configurations. Preceding sections gave more general overview. Embodiments herein describe how some spatial coding schemes may be used to form such an MBFSN network.

Figure 7:
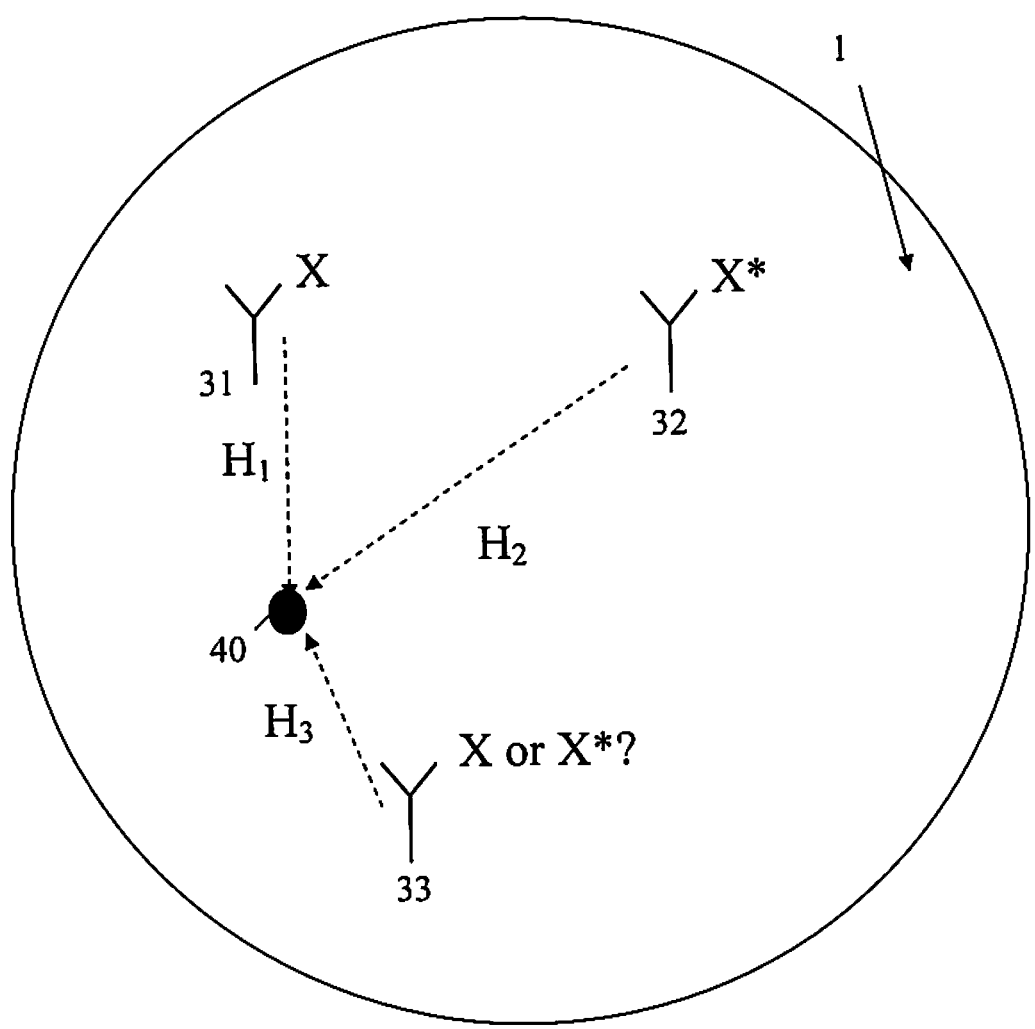
FIG. 7 shows an example on how a UE selects a code text.

FIG. 7 shows an example on how a UE 40 selects a first code text X or a second code text X* in cell-3, assuming that cell-1 and cell-2 have already selected X and X*, respectively. The selected criteria is therefore an exhausting search of the best allocation of the code text X or X* in cell 3, i.e.

$$\operatorname*{argmax}_{i=\{0,1\}} f(\|H_1 + i*H_3\|^2 + \|H_2 + (1-i)*H_3\|^2)$$

wherein:

H—is the distance between the UE and the associated distributed transmit antenna, for example, $H_1$, $H_2$ and $H_3$ represent the distance between the UE and distributed transmit antennas 31, 32 and 33 in FIG. 7.

Figure 8:
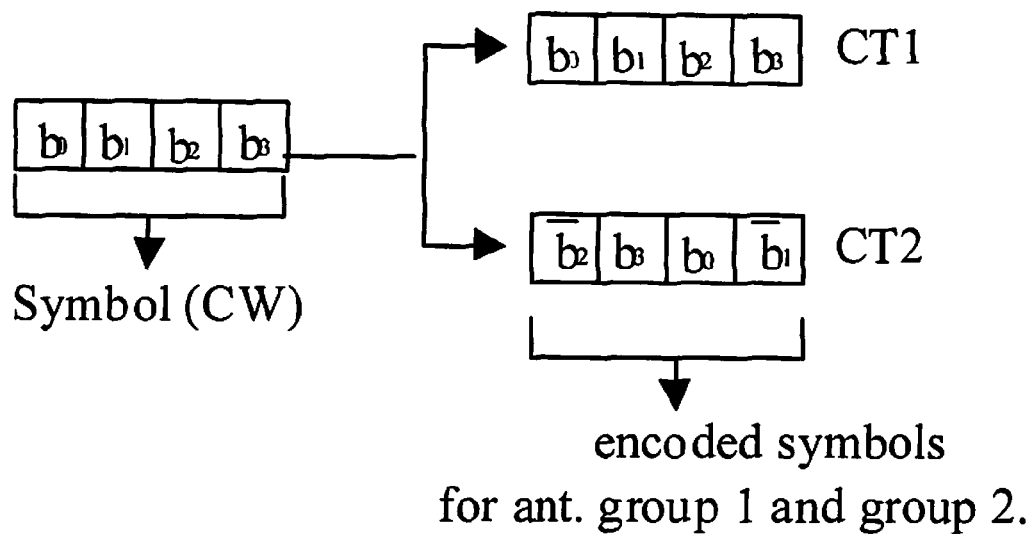
FIG. 8 shows a schematic overview of a joint STBC coding.

FIG. 8 shows a joint STBC coding for a MBSFN transmission in unequal transmit antenna configuration. With the STBC precoding, the symbol [b0, b1, b2, b3] is encoded into code text 1, CT1, and code text 2, CT2, which will be mapped onto different transmit antenna groups served within an MBMS area. Then, as an example, the joint STBC coding for the MBSFN area with this unequal transmit antenna configuration is as follows: STBC code text 1 [$b_0$, $b_1$, $b_2$, $b_3$] is distributed to transmit antenna group #1, and STBC code text 2 [$\overline{b}_2$, $b_3$, $b_0$, $\overline{b}_1$] is distributed to transmit antenna group #2

Figure 9:
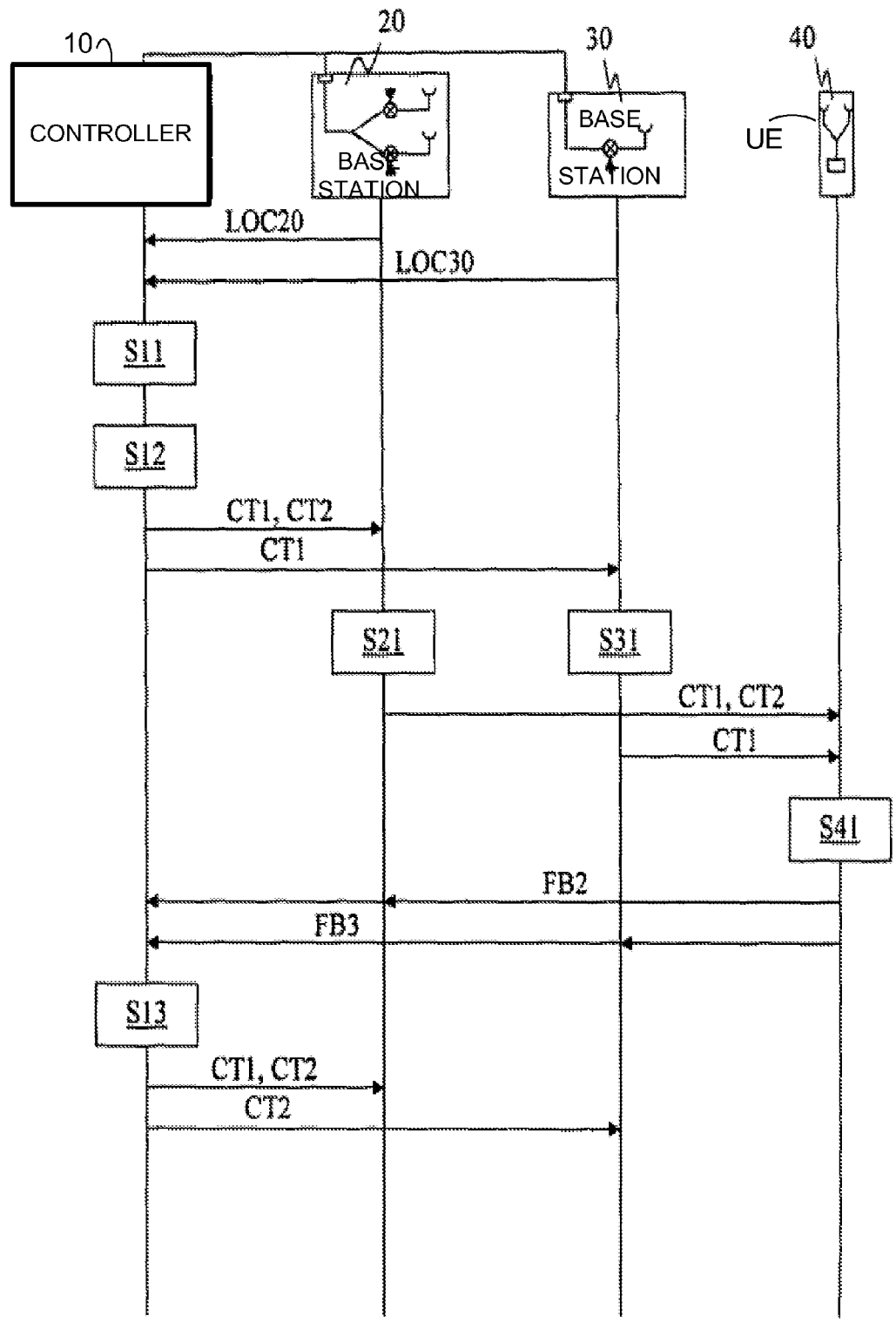
FIG. 9 shows a combined method and signaling scheme.

In FIG. 9, an example of a combined method and signaling scheme in an MBSFN is shown.

Optionally, a first base station 20 and a second base station 30 informs a controller node such as a OAM, BSC, MME or the like, of the location of coverage area of the transmit antennas in messages LOC20, LOC30. Data indicating transmit antenna configuration of the different base stations may also be included in the messages. The data may be regarding number of transmit antennas, merely base station location and the coverage of the transmit antennas are known, coverage direction and/or the like; data from which the controller determines coverage of each transmit antenna in order to group the transmit antennas in an optimized manner so that the user equipment receives all code texts.

In step S11, the controller node 10 performs a joint spatial coding of a symbol/s, resulting in a first code text and a second code text. The coding may be PARC, SBTC or the like.

In step S12, the controller node 10 groups the transmit antennas in the MBSFN. As stated above an MBSFN area may comprise base stations with unequal number of transmit antennas. There are two ways in which transmit antenna groups can be created. One is autonomously carried out by the network and the other relies on UE feedback as well. In both cases the ultimate decision of transmit antenna group selection will be taken by the controller node 10.

It should here be noted that logical controller node 10 is a centralized node but physically it may be a separate node or it may be located in one of the base stations, nodes 20 or 30. If UE feedback is not available, the controller node 10, which may know different base station transmit antenna configuration and capability, decides at its own to set up transmit antenna groups for the spatial coding.

For instance the controller node 10 may setup transmit antenna group based on some pre-determined rules, such as distribution of the first and the second code texts to transmit antennas in alternating base station sites and/or the like.

In both cases, controller node 10 configures the base stations in order to build the transmit antenna groups for code text distribution.

The controller node 10 then distributes the code texts. For example, base station 20 comprises transmit antennas #1 and #2 (i.e. 2 Tx) and base station 30 comprises an transmit antenna #3 of a different site (i.e. 1 Tx). In this example, two transmit antenna groups may be created: group #1 (transmit antenna #1 and #3) and group #2 (transmit antenna #2) and the controller node 10 distributes the first code text CT1 to group #1 and the second code text CT2 to group #2.

The first base station 20 receives the first code text CT1 and the second code text CT2 and the second base station 30 receives the first code text CT1.

In step S21, the first base station 20 sets itself up in an operational state arranged to use the first code text CT1 for the first transmit antenna #1 and the second code text for the second transmit antenna #2.

These settings CT1 and CT2 are then distributed to a user equipment 40 within the MBSFN.

In step S31, the second base station 30 sets itself up in an operational state arranged to use the first code text CT1 for the transmit antenna #3.

This setting of CT1 is then distributed to the user equipment 40.

In step S41, the UE 40 performs a selection. The UE 40 selects its best transmit antenna group and feedback data FB1, FB2 to the controller node 10 to regroup the transmit antenna groups within an MBSFN area. In some embodiments, several UEs will provide feedback to the base stations 20, 30, the feedback information may be the preferable precoding weighting vector(s) of the UE, its associated codebook(s) index or the like. The feedback data FB1, FB2 are then forwarded to the controller node 10. The preferable precoding weighting vector(s) may be obtained according to different criteria, e.g. the preferable precoding vector may be obtained through an exhausted search for achieving the best throughput performance. The usage of this criterion is merely an example and does not exclude other potential methods to obtain the preferable precoding vector(s) for different UEs.

Each UE estimates its own channel state information, selects one sub-band most suitable for its transmission, then determines the best precoding vector in a set of codebook according to maximization of receive signal-to-noise ratio (SNR) over that sub-band and calculates the channel quality indicator (CQI) value. After this procedure, the UE feedbacks the individual selected sub-band index, corresponding precoder index, CQI value and/or the like to the base stations 20, 30.

In optional step S13, the controller node 10 regroups the transmit antennas based on the feedback FB1, FB2. The controller node 10 regroups the transmit antenna groups based on the statistics and distribute the code texts CT1, CT2 to the transmit antenna group. In the example, the transmit antenna of the second base station is changed to CT2.

In a joint coding for 2×2 PARC for MBSFN transmission in an unequal transmit antenna configuration the following happens. In PARC, the coding rate and the modulation of the stream transmitted from each transmit antenna is controlled based on channel quality information e.g. based on feedback sent to the transmitter by the receiver. The unitary 2×2 PARC precoding matrix is $$\frac{1}{\sqrt{2}}\begin{bmatrix} 1 & 0 \\ 0 & 1 \end{bmatrix}.$$

where the row weighting vector j, j ∈ {1,2} is for rank j, j ∈ {1,2}, and the elements of each vector are relevant to the transmit antenna ports, i.e., with 2×2 PARC, two streams are transmitted from the two transmit antenna ports independently.

Then, the transmit antenna groups are set up, wherein UEs may select their best transmit antenna group. This means that several UEs will provide feedback to the base stations, the feedback information may be the UEs' preferable precoding weighting vector(s), or its(their) associated codebook(s) index, and the base stations in their turn forward this to a controller node or a controller part of the base station.

Exemplary, a first site #A comprises transmit antenna #1 and #2 (i.e. 2 Tx) and a second site #B comprises transmit antenna #3. Then as an example:

PARC code text #1

$$\left(\frac{1}{\sqrt{2}}\right)$$

is distributed to transmit antenna group #1 (transmit antennas 1 and 3).

PARC code text #2

$$\left(\frac{1}{\sqrt{2}}\right)$$

is distributed to transmit antenna group #2 (transmit antenna 2).

PARC in the above example is used to transmit different streams over the different physical transmit antennas. We can indeed treat PARC as a special precoding scheme in which the different streams are transmitted over the transmit antennas without precoding.

In the above described examples, it is shown that the network provide means to adapt or reconfigure the spatial coding at different base station sites. The reconfiguration may have to be done at least on semi-static manner either based on UE feedback or if base station is upgraded or if a new base station is added or removed. Therefore there should be signaling support between the base station sites and/or between base stations and the network node, e.g. MBSFN radio node, where code text is generated and distributed to base stations in MBSFN area.

The method is applicable to any unicasting/multicasting/broadcasting network such as MBSFN in E-UTRAN, MBSFN in WCDMA, MBSFN based on distributed transmit antenna system (DAS) for IMT-advance, DVB-H etc.

Secondly the concept of joint coding and distribution to transmit antenna groups may also be applied to overlapping MBSFNs.

The concept of joint coding and distribution to transmit antenna groups may also be used for unicast services (user specific service), i.e. applying joint coding to transmit antennas, which belong to different base station sites in E-UTRAN or WCDMA. This means user specific code text is distributed via transmit antennas located in different base stations and thus will receive unicast data from multiple transmit antennas. In this way spatial coding can be used also for unicast services in unequal transmit antenna scenario e.g. when all or some of the base stations are equipped with only one transmit antenna. Compared to MBSFN, the reception of unicast service, which is spatially coded at transmit antennas located at different base station sites, is more complex. The reason is that in the former case the UE transparently receive the data as it is sent using same physical resources (e.g. resource blocks etc) from all sites. In case of unicast reception, the transmission from different transmit antennas at different sites shall typically take over different physical resources. Hence, UE has to separately decode and combine the received data from different sites.

Embodiments relate to a basic MIMO structure which provides diversity or spatial multiplexing gain by fully employing the transmit antennas, which may or may not belong to the same cell. This arrangement can be possible in different transmit antenna setup scenarios, e.g. when all cells don't have the equal transmit antennas or the like.

By employing the same spatial transmission mode in an entire MBSFN, e.g. MIMO and STBC, even if transmit antenna configuration is different in different sites in MBSFN area a plurality of advantages are obtained. For example, the interference is reduced since full MIMO capability may be employed, the coverage is increased by the transmit antenna reuse and by partially sharing the spatial coding, it also prevents the need for doing spatial mode switching when UE moves in MBSFN area between cells with different transmit antenna configuration, the MIMO scheme can be easily enhanced in the entire MBSFN area even if there is partial upgrade of the transmit antenna deployment (e.g. increasing from 1-2 transmit antennas to 2-4 transmit antennas), space time block coding can even be used in MBSFN network with base stations with single transmit antenna, and/or the like.

Figure 10:
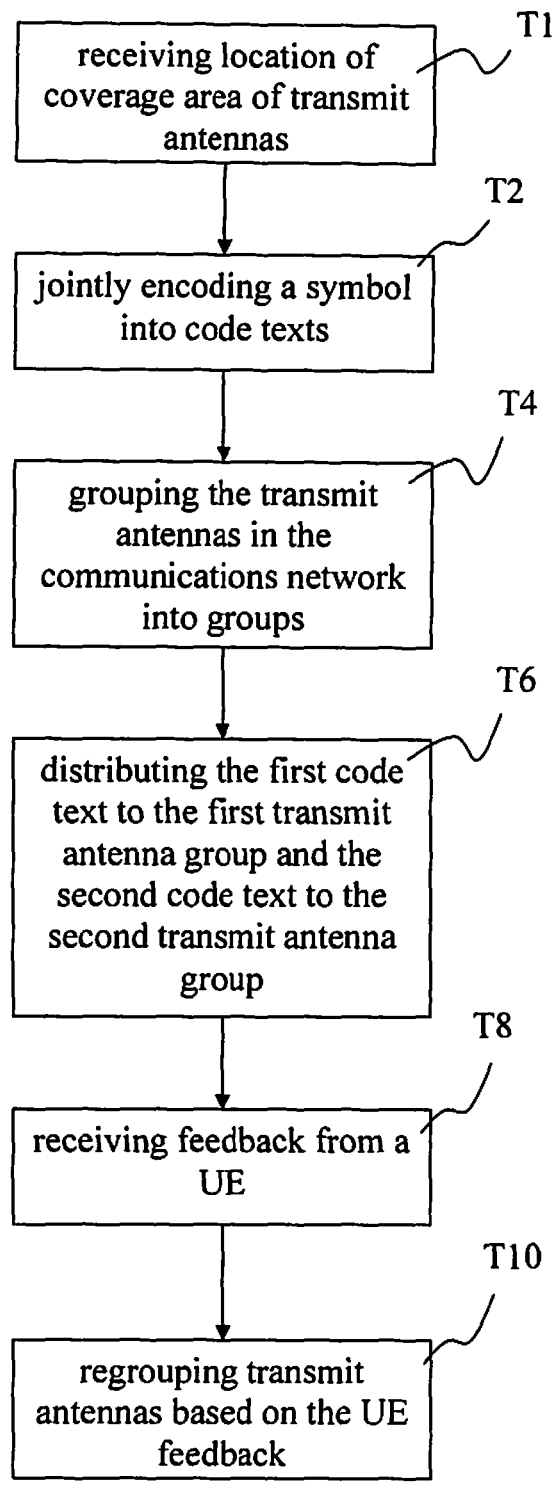
FIG. 10 shows a schematic flow chart of a method in a controller node.

In FIG. 10, a schematic flow chart in a controller node 10 within a communications network comprising at least two communication nodes each comprising at least one transmit antenna is shown. The communications network may be a MBSFN, a network providing unicast services and/or the like. In some embodiments, at least two communication nodes in the communications network comprise an unequal number of transmit antennas, for example, one, two and/or four.

In optional step T1, the controller node receives data from base stations within the communications network. The data indicates a location of coverage areas of the transmit antennas within the communications network. The indication may be a location of the base station and the type of transmit antenna, transmit antenna configurations, such as number of transmit antennas of a base station, direction of coverage of a transmit antenna, and/or the like. In some embodiments, this or some of the information may also be preset in the controller node.

In step T2, the controller node performs a joint spatial coding of a symbol into at least a first and a second code text. It should be understood that the joint spatial coding may result into more than two code texts, for example, four code texts or the like.

In step T4, the controller node groups the transmit antennas in the communications network into at least a first transmit antenna group and a second transmit antenna group based on the location of coverage area of the transmit antennas.

In some embodiments, the grouping is based on the location of the coverage of the transmit antennas so that the distribution of the different code texts is arranged to distribute the code texts to user equipments in a way that a user equipment within the communications network receives both the code texts. For example, to obtain an optimised distribution the coverage locations are arranged in an overlapping manner. In some embodiments, in order to get optimised distribution the grouping is arranged so that the first code text and the second code text are distributed to transmit antennas in alternating sites. It should be understood that other ways of obtaining an optimised distribution are also possible. And, in some embodiments, the grouping may also be based on predetermined capacity of the nodes, stored within the controller node. This predetermined capacity may be programmed before installation, sent to the controller node and/or the like.

In some embodiments, the location of the coverage area of every node in the communications network is retrieved during initial setup of the node, updated periodically, or when a new node is added to the communications network. The location of coverage area may be based on the location of the base station/transmit antenna, transmit antenna coverage direction, transmit antenna range and/or the like.

In step T6, the controller node distributes the first code text to the first transmit antenna group and the second code text to the second transmit antenna group.

In optional step T8, the controller node receives feedback from a user equipment indicating selected transmit antenna group.

In optional step T10, the controller node regroups the transmit antennas based on the feedback from the user equipment. In some embodiments, the regrouping is based on statistics of feedback from a plurality of user equipments.

In order to perform the method a controller node is provided.

Figure 11:
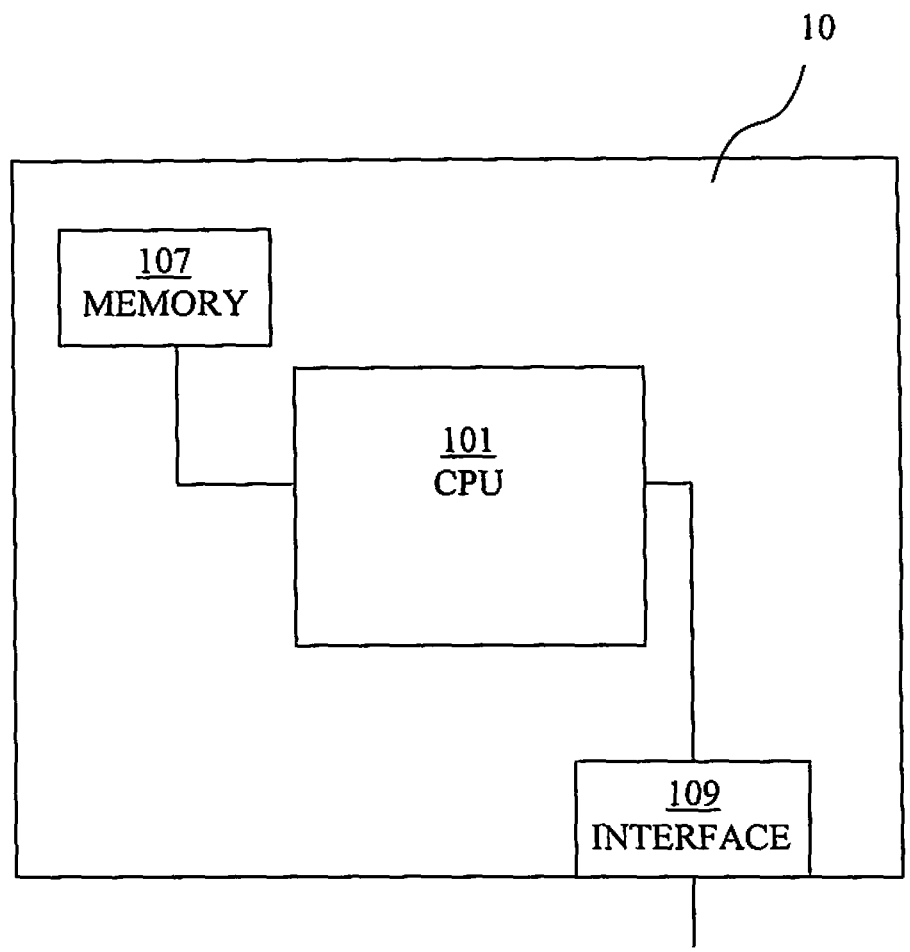
FIG. 11 shows a schematic overview of a controller node.

In FIG. 11, a schematic overview of a controller node 10 is shown. A controller node may comprise an Operation and Maintenance Node, eNodeB, base station controller (BSC), radio network controller (RNC), Mobility Management Entity, or the like. The controller node may also comprise a base station combined with a controller part such as an eNodeB, or the like.

The controller node 10 is arranged, in a communications network comprising at least two communication nodes each comprising at least one transmit antenna, to distribute code texts of a joint spatial coding to the nodes. In some embodiments, at least two communication nodes in the communications network comprise an unequal number of transmit antennas, for example, some comprise one transmit antenna, some two and/or four transmit antennas.

The controller node 10 comprises a control unit 101 arranged to joint spatial code a symbol into at least a first code text and a second code text, and to group the transmit antennas in the communications network into at least a first transmit antenna group and a second transmit antenna group based on the location of coverage area of the transmit antennas.

The control unit 101 may, in some embodiments, be arranged to group the transmit antennas based on the location of coverage area of the transmit antennas so that the distribution of the different code texts is arranged in a way such that a user equipment within the communications network receives both the code texts. For example, the different groups are grouped in a way so that coverage locations are arranged in an overlapping manner in order to obtain an optimised distribution. In some embodiments, the control unit 101 is arranged to group the transmit antennas so that the first code text and the second code text are distributed to transmit antennas in alternating sites in order to obtain an optimised distribution. It should be understood that other ways of obtaining an optimised distribution also exist.

The control unit 101 may also arranged to group the transmit antennas based also on predetermined capacity of the nodes, stored in a memory 107 within the controller node 10. The memory unit 107 may be arranged to store the code texts and/or an application/s arranged to be executed on the control unit 101 to perform the method steps. The predetermined capacity may be programmed before installation, sent to the controller node and/or the like.

The controller node 10 further comprises a network interface 109 configured to distribute the first code text to the first transmit antenna group and the second code text to the second transmit antenna group.

The network interface 109 may, in some embodiments, further be arranged to receive feedback from a user equipment, the feedback comprises data of a selected transmit antenna group and the control unit 101 is then arranged to use the feedback to regroup the transmit antennas in the communications network. Furthermore, the control unit 101 may be arranged to regroup the transmit antennas in the communications network based on statistics of feedback from a plurality of user equipments.

In some embodiments, the controller node 10 may be arranged to retrieve location of the coverage of the transmit antennas in the communications network during initial setup of the controller node, during periodically updating, and/or when a new node is added to the communications network.

The communications network may comprise a Multimedia Broadcast Single Frequency Network, a network providing a unicast service and/or the like. The joint spatial coding comprises Space Time Block Coding, Per Antenna Rate control and/or the like.

Figure 12:
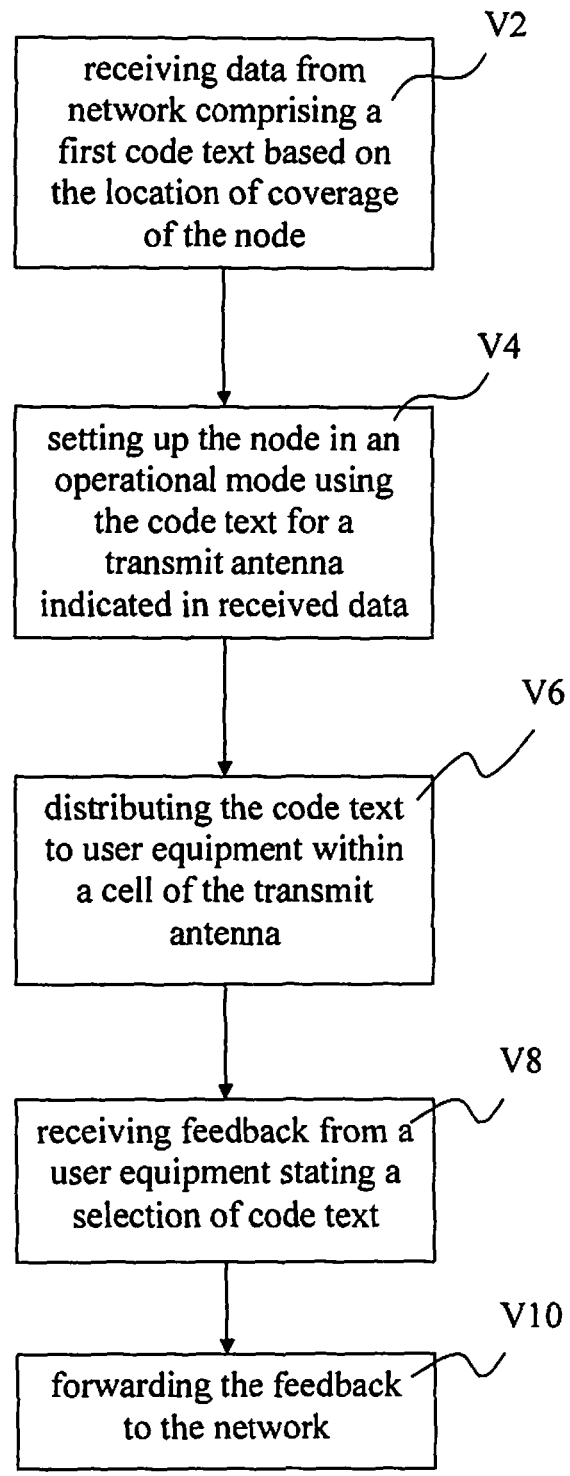
FIG. 12 shows a schematic flow chart of a method in a second communication node.

In FIG. 12, a schematic flow chart of a method in a second communication node within a communications network comprising at least two communication nodes each comprising at least one transmit antenna is disclosed.

In step V2, the second communication node receives from a controller node a first code text of a joint spatial coding based on the location of coverage area of the transmit antenna of the second communication node. If the second communication node is a part of a controller node the first code is received from within the combined node and if the nodes are separated the first code text is received over a network.

In optional step V4, the second communication node sets up the second communication node in an operational state to apply the first code text to a transmission of data on a radio channel from the first transmit antenna within the cell of the first transmit antenna and transmitting the data.

In step V6, the second communication node distributes the first code text to user equipment over a radio channel within a cell of a first transmit antenna.

In optional step V8, the second communication node receives feedback from a user equipment regarding the first code text wherein the feedback indicates a selection of the first code text.

In optional step V10, the second communication node forwards the feedback to the controller node of the communications network.

In order to perform the method a second communication node is provided.

Figure 13:
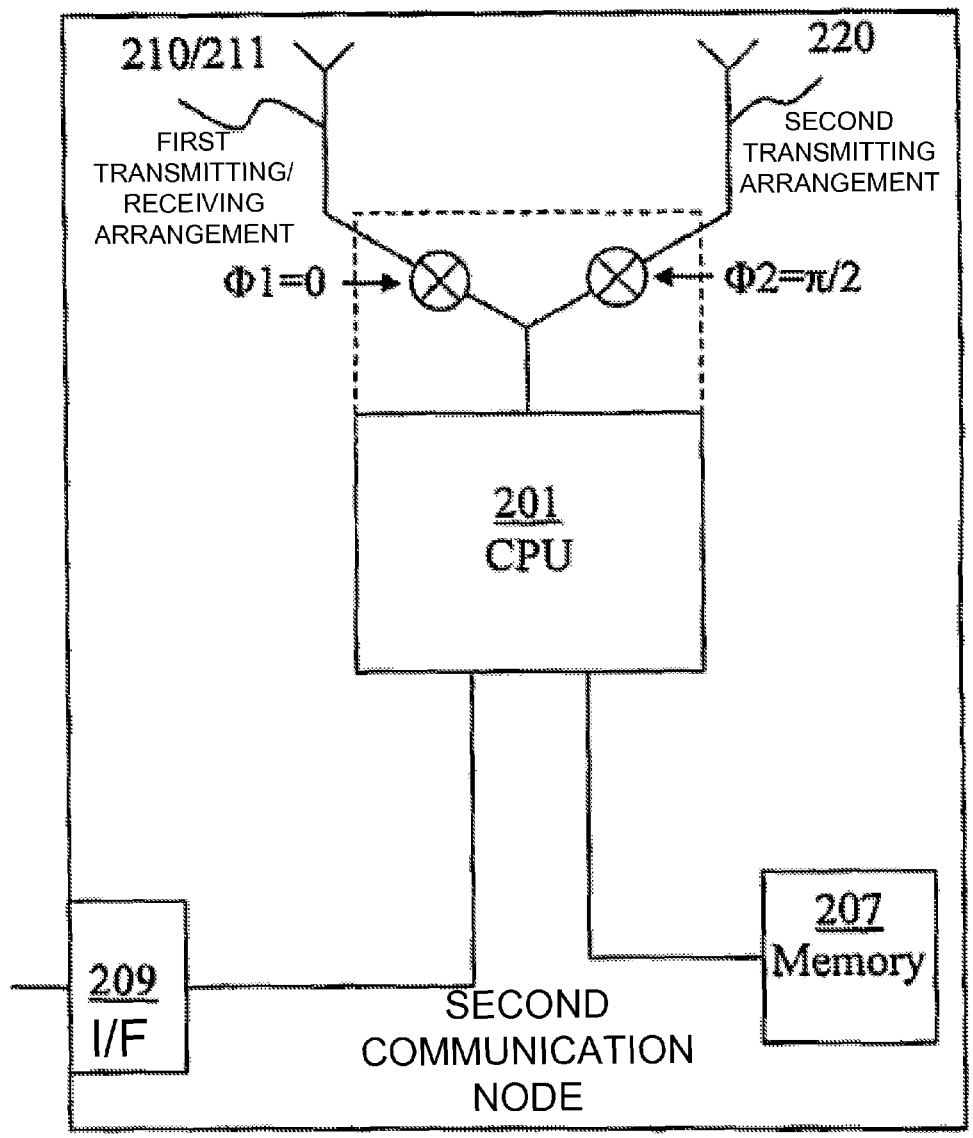
FIG. 13 shows a schematic overview of a second communication node.

In FIG. 13, a schematic overview of a second communication node 20 is shown. The second communication node may comprise a base station (BS), an access point (AP), a radio access station (RAS), a nodeB (Node-B), an evolved Node-B (eNB), a base transceiver station (BTS), a mobile multihop relay (MMR)-BS1 and/or the like, and includes entire or partial functions of the AP, RAS, Node-B, eNB, BTS, and MMR-BS. It should be understood that the second communication node may be a combined node of a controller node, such as a eNodeB, or the like.

The second communication node 10 is arranged, in a communications network comprising at least two communication nodes each comprising at least one transmit antenna, to distribute code texts of a joint spatial coding to the nodes.

The second communication node comprises a network interface 209 arranged to receive from a controller node a first code text based on a location of coverage of a first transmitting arrangement 210 of the second communication node. Furthermore, the second communication node comprises a control unit 201 arranged to distribute through the first transmitting arrangement 210 the first code text to a user equipment within a cell of the first transmitting arrangement 210. The transmitting arrangement 210 comprises a transmit antenna. It should also be understood that the second communication node may comprise a second transmitting arrangement 220, and/or a third, fourth etc., transmitting arrangement.

The control unit 201 may further be arranged in some embodiments to apply the first code text to a transmission of data on a radio channel from the first transmitting arrangement 210 within the cell of the first transmitting arrangement 210 and to transmit the data over the first transmitting arrangement 210. In the illustrated example, the first code text may indicate a first phase shift $\phi 1$ of, for example, 0 degrees and the second communication node 20 may comprise a second transmitting arrangement wherein a second code text is used indicating a second phase shift $\phi 2$, for example, 90 degrees, $\pi/2$, over a second transmitting arrangement 220. The phase shifts ($\phi 1$) and ($\phi 2$) are indeed the weight factors, which are applied by the control unit 201. In closed loop MIMO schemes the weight are determined by the UE for each antenna and signaled to the network, which in turn applies at the corresponding antennas. However, in open loop MIMO scheme the network itself chooses suitable weight factors at different transmit antennas.

The second communication node may, in some embodiments, further comprise a receiving arrangement 211 configured to receive feedback from a user equipment regarding the first code text. The feedback indicates a selection of the first code text and the control unit 201 is arranged to forward the feedback to the controller node in the network over the network interface 209. It should here be noted that the transmitting/receiving arrangement may be separated units and/or, as illustrated, comprise the same antenna.

The second communication node 20 may further comprise a memory unit 207 wherein the code texts may be stored and/or an application arranged to be executed on the control unit to perform the method steps.

Figure 14:
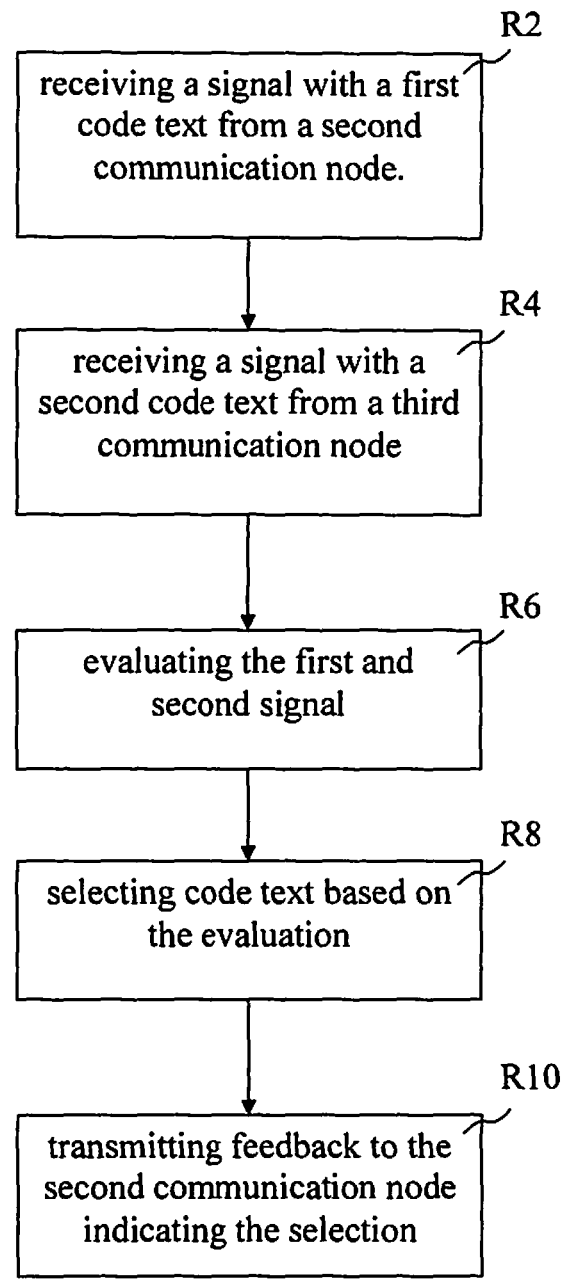
FIG. 14 shows a schematic flow chart of a method in a user equipment.

In FIG. 14, a schematic overview of a method in a user equipment is shown. The user equipment is within a communications network comprising at least two communication nodes each comprising at least one transmit antenna and the method is for selecting an operational setup using a code text of a joint spatial coding.

In step R2, the user equipment receives a first signal with a first code text from a second communication node. The first code text is either transmitted as a unicast, multicast, and/or a broadcast over a radio channel.

In step R4, the user equipment receives a second signal with a second code text from a third communication node. The second code text is either transmitted as a unicast, multicast, and/or a broadcast over a radio channel.

In step R6, the user equipment evaluates the first and second signal.

In step R8, the user equipment selects code text based on the evaluation. The selection may in some embodiments be to select the preferable precoding weighting vector(s) of the UE, its associated codebook(s) index or the like. The preferable precoding weighting vector(s) may be obtained according to different criteria, e.g. the preferable precoding vector may be obtained through an exhausted search for achieving the best throughput performance.

In step R10, the user equipment transmits feedback to the second communication node indicating the selection. The second communication node then, in the case where the second communication is separated from the controller, forwards the feedback to the controller node.

In order to perform the method a user equipment is provided.

Figure 15:
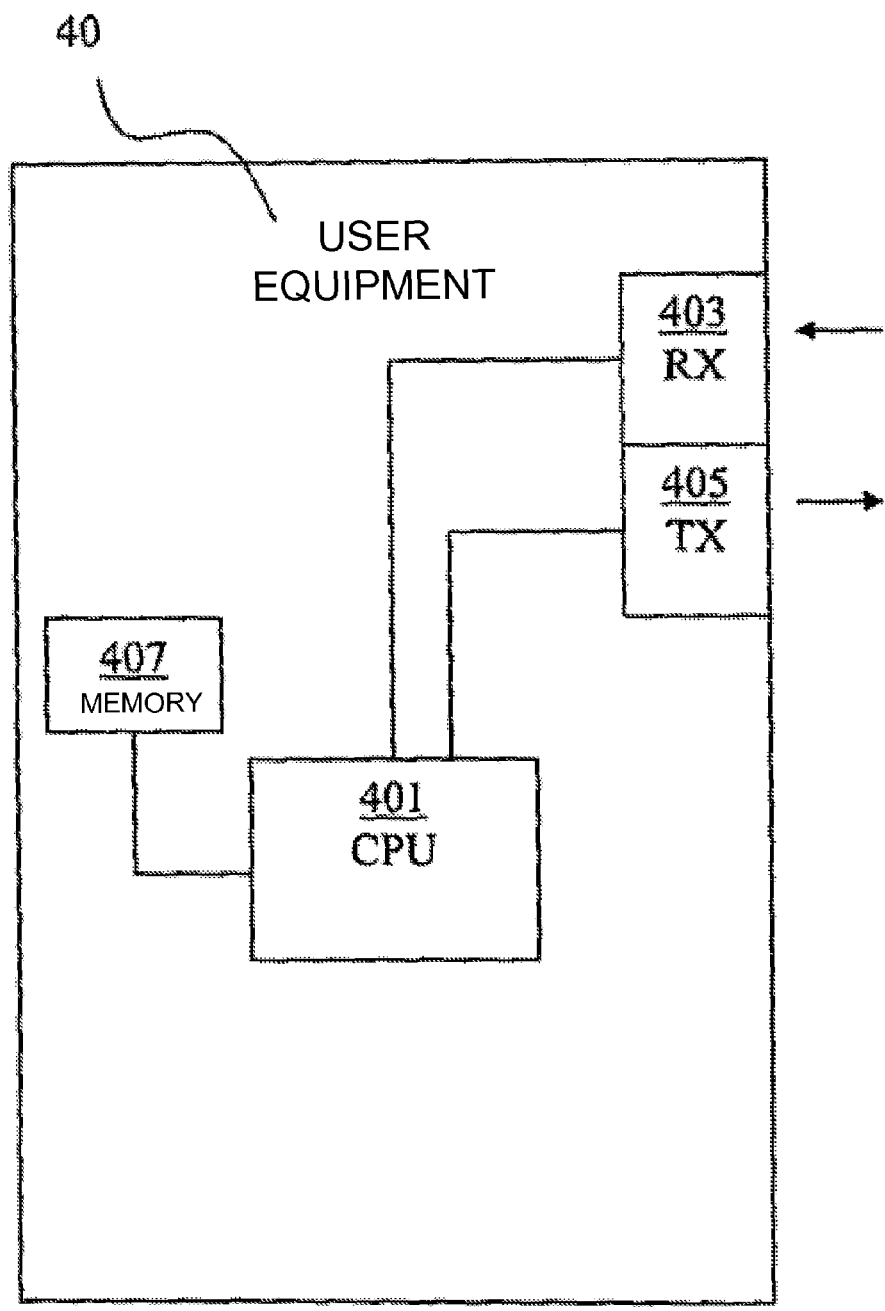
FIG. 15 shows a schematic overview of a user equipment.

In FIG. 15, a user equipment 40 is shown. The user equipment represents a terminal, a mobile terminal (MT), a subscriber station (SS), a mobile station (MS), a portable subscriber station (PSS), an access terminal (AT), and/or the like, and includes entire or partial functions of the terminal, mobile terminal, subscriber station, portable subscriber station, mobile station, and access terminal.

The user equipment 40 is arranged, in a communications network comprising at least two communication nodes each comprising at least one transmit antenna, to select an operational setup using a code text of a joint spatial coding.

The user equipment 40 comprises a receiving arrangement 403 configured to receive a first signal with a first code text from a second communication node and a second signal with a second code text from a third communication node. The second and third communication nodes, for example, comprise base stations. The user equipment further comprises a control unit 401 arranged to evaluate the signals and based on the evaluation to select code text and to create feedback data indicating the selection. The user equipment additionally comprises a transmitting arrangement 405 configured to transmit the feedback data to the second communication node.

It should be understood that the transmitting arrangement 405 may comprise a first transmit antenna and/or a plurality of transmit antennas and that the receiving arrangement may comprise own antennas or using the same antennas.

The control unit 401 may in some embodiments be arranged to select the code text/signal based on the evaluation to find a preferred precoding weighting vector, or its associated codebook index.

The preferable precoding weighting vector(s) may be obtained according to different criteria, e.g. the preferable precoding vector may be obtained through an exhausted search for achieving the best throughput performance.

Furthermore, the user equipment may comprise a memory unit 407 arranged to store the code texts and/or application/s to perform the method when executed on the control unit 401.

The user equipment may be a mobile device including additional arrangements such as a support structure including a chassis and a cover, directly or indirectly supporting the other components of the terminal. The mobile device may further be devised with a user input interface comprising a keypad and preferably also a microphone. The user input interface may also comprise a touch-sensitive display in addition to or instead of the keypad. Furthermore, a user output interface of mobile device comprises a display and preferably also a speaker. A power supply is preferably included in mobile device in the form of a battery, and a cable socket for connection to a mains outlet via a transformer.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a controller node for distributing code text of a joint spatial coding in a communications network comprising at least two communication nodes, the at least two communication nodes comprising a different number of transmit antennas and different spatial method capabilities, the method comprising:
   joint spatial coding a symbol resulting in at least a first spatial code text and a second spatial code text, the first spatial code text and the second spatial code text being output from a precoder, the first code text comprising a real symbol and the second code text being a complex conjugate of the first code text,
   grouping the transmit antennas in the communications network into at least a first transmit antenna group and a second transmit antenna group based on a location of coverage area of the transmit antennas and feedback from user equipment units, and
   distributing the first spatial code text to the first transmit antenna group for transmission to a second communication node for inclusion in a first signal to be transmitted from the second communication node and distributing the second spatial code text to the second transmit antenna group for transmission to a third communication node for inclusion in a second signal to be transmitted from the third communication node.

2. A method according to claim 1, wherein the grouping is based on the location of coverage area of the transmit antennas so that the distribution of different spatial code texts is arranged to distribute the spatial code texts to user equipments in a way that a user equipment within the communications network receives both the spatial code texts.

3. A method according to claim 1, wherein the grouping is arranged so that the first spatial code text and the second spatial code text are distributed to transmit antennas in an alternating manner based on the location of the coverage of the transmit antennas.

4. A method according to claim 1, wherein regrouping of the transmit antennas comprises receiving feedback from a user equipment indicating selected transmit antenna group based on distance between the user equipment and a transmit antenna or throughput which is then used to regroup the transmit antennas.

5. A method according to claim 4, wherein the regrouping is based on statistics of feedback from a plurality of user equipments.

6. A method according to claim 1, wherein the grouping is also based on predetermined capacity of the nodes, stored within the controller node.

7. A method according to claim 1, wherein the location of the coverage area of every node in the communications network is retrieved during initial setup of the controller node, updated periodically, and/or when a new node is added to the communications network.

8. A method according to claim 1, wherein the communications network comprises a Multimedia Broadcast Single Frequency Network and/or the joint spatial coding comprises Space Time Block Coding, Per Antenna Rate control or the like.

9. A controller node in a communications network comprising at least two communication nodes, the at least two communication nodes comprising a different number of transmit antennas and different spatial method capabilities, the controller node being arranged to distribute spatial code texts of a joint spatial coding to the nodes, wherein the controller node comprises:
   a control unit arranged to:
      joint spatial code a symbol into at least a first spatial code text and a second spatial code text, the first spatial code text and the second spatial code text being output from a precoder, the first code text comprising a real symbol and the second code text being a complex conjugate of the first code text,
      group the transmit antennas in the communications network into at least a first transmit antenna group and a second transmit antenna group based on a location of coverage area of the transmit antennas and feedback from user equipment units, and
   a network interface configured to distribute the first spatial code text to the first transmit antenna group for transmission to a second communication node for inclusion in a first signal to be transmitted from the second communication node and the second spatial code text to the second transmit antenna group for transmission to a third communication node for inclusion in a first signal to be transmitted from the third communication node.

10. A controller node according to claim 9, wherein the control unit is arranged to group the transmit antennas based on the location of coverage area of the transmit antennas so that the distribution of the different spatial code texts is arranged in a way such that a user equipment within the communications network receives both the spatial code texts.

11. A controller node according to claim 9, wherein the feedback from the user equipments comprises data of a selected transmit antenna group and the control unit is arranged to use the feedback to regroup the transmit antennas in the communications network.

12. A controller node according to claim 11, wherein the control unit is arranged to regroup the transmit antennas in the communications network based on statistics of feedback from a plurality of user equipments.

13. A controller node according to claim 9, wherein the control unit is arranged to group the transmit antennas based also on predetermined capacity of the nodes, stored in a memory within the controller node.

14. A controller node according to claim 9, wherein the controller node is arranged to retrieve location of the coverage of the transmit antennas in the communications network during initial setup of the controller node, during periodically updating, and/or when a new node is added to the communications network.

15. A controller node according to claim 9, wherein the communications network comprises a Multimedia Broadcast Single Frequency Network, and/or the joint spatial coding comprises Space Time Block Coding, Per Antenna Rate control and/or the like.

16. A controller node according to claim 9, wherein the control unit is arranged to group the transmit antennas so that the first spatial code text and the second spatial code text are distributed to transmit antennas in an alternating manner based on the location of the coverage of the transmit antennas.

17. A controller node according to claim 9, comprising a base station, base station controller, eNodeB, or/and a combination thereof.

18. A method in a second communication node within a communications network comprising at least two communication nodes, the at least two communication nodes comprising a different number of transmit antennas and different spatial method capabilities, the method comprising:
    receiving from a controller node a first spatial code text of a joint spatial coding based on a location of coverage area of the transmit antennas and feedback from user equipments, the first spatial code text comprising a real symbol and a second spatial code text being a complex conjugate of the first spatial code text, the first spatial code text and the second spatial code text being output from a precoder, the second spatial code text being transmitted from the controller node to a third communication node, and
    distributing the first spatial code text to a user equipment within a cell of a first transmit antenna of the second communication node.

19. A method according to claim 18, further comprising
    setting up the second communication node in an operational state to apply the first spatial code text to a transmission of data on a radio channel from the first transmit antenna within the cell of the first transmit antenna and transmitting the data.

20. A method according to claim 18, further comprising the step of receiving feedback from a user equipment regarding the first spatial code text wherein the feedback indicates a selection of the first spatial code text based on distance between the user equipment and transmit antennas or throughput, and
    forwarding the feedback to the controller node of the communications network.

21. A second communication node in a communications network comprising at least two communication nodes comprising a different number of transmit antennas and different spatial method capabilities, to set up operational setting of joint spatial coding within the communications network, the second communications node comprising:
    a network interface arranged to receive from a controller node a first spatial code text of a joint spatial coding based on a location of coverage of the transmit antennas and feedback from user equipments, the first spatial code text comprising a real symbol and a second spatial code text being a complex conjugate of the first spatial code text, the first spatial code text and the second spatial code text being output from a precoder, the second spatial code text being transmitted from the controller node to a third communication node, and
    a control unit arranged to distribute through a first transmitting arrangement the first spatial code text to a user equipment within a cell of the first transmitting arrangement.

22. A second communication node according to claim 21, wherein the control unit is further arranged to apply the first spatial code text to a transmission of data on a radio channel from the first transmitting arrangement within the cell of the first transmitting arrangement and to transmit the data over the first transmitting arrangement.

23. A second communication node according to claim 21, further comprising a receiving arrangement configured to receive feedback from a user equipment regarding the first spatial code text wherein the feedback indicates a selection of the first spatial code text and the control unit is arranged to forward the feedback to the controller node in the network over the network interface.

24. A second communication node according to claim 21, wherein the second communication node comprises a base station, and/or the like.

25. A method in a user equipment within a communications network comprising at least two communication nodes, the at least two communication nodes comprising a different number of transmit antennas and different spatial method capabilities, for selecting an operational setup using a spatial code text of a joint spatial coding, the method comprising:
    receiving a first signal with a first spatial code text from a second communication node,
    receiving a second signal with a second spatial code text from a third communication node,
    evaluating the first and second signal based on distance between the user equipment and transmit antennas or throughput,
    selecting spatial code text based on the evaluation,
    transmitting feedback to the second communication node indicating the selection
    wherein the spatial code text is output from a precoder; and
    wherein the first code text comprises a real symbol and the second code text is a complex conjugate of the first code text.

26. A method according to claim 25, wherein the selecting spatial code text is based on evaluating the first and second signals to determine a preferred precoding weighting vector, and/or its associated codebook index.

27. A user equipment arranged, in a communications network comprising at least two communication nodes, the at least two communication nodes comprising a different number of transmit antennas and different spatial method capabilities, to select an operational setup using a spatial code text of a joint spatial coding, the user equipment comprises:
    a receiving arrangement configured to receive a first signal with a first spatial code text from a second communication node and a second signal with a second spatial code text from a third communication node, wherein the spatial code text is output from a precoder; and wherein the first code text comprises a real symbol and the second code text is a complex conjugate of the first code text,
    a control unit arranged to evaluate the signals based on distance between the user equipment and transmit antennas or throughput and based on the evaluation to select spatial code text and to create feedback data indicating the selection, and
    a transmitting arrangement configured to transmit the feedback data to the second communication node.

28. A user equipment according to claim 27, wherein the control unit is arranged to select the spatial code text based on the evaluation to find a preferred precoding weighting vector, and/or its associated codebook index.

29. A method according to claim 25, wherein the first code text comprises a real symbol and the second code text is a complex conjugate of the first code text.

30. A method according to claim 1, wherein the first code text and the second code text comprise precoding weighting vectors.

\* \* \* \* \*

UNITED STATES PATENT AND TRADEMARK OFFICE
CERTIFICATE OF CORRECTION

| | |
|---|---|
| PATENT NO. | : 8,717,947 B2 |
| APPLICATION NO. | : 13/060201 |
| DATED | : May 6, 2014 |
| INVENTOR(S) | : Liao et al. |

Page 1 of 1

It is certified that error appears in the above-identified patent and that said Letters Patent is hereby corrected as shown below:

On the Title Page, Item (57), under "ABSTRACT", in Column 2, Line 6, delete "(12, S11)" and insert -- (T2, S11) --, therefor.

In the Specification

In Column 3, Line 45, delete "on" and insert -- of --, therefor.

In Column 5, Line 60, delete "coding includes" and insert -- coding 42 includes --, therefor.

In Column 7, Line 31, delete "on" and insert -- of --, therefor.

In Column 13, Line 20, delete "communication node 10" and insert -- communication node --, therefor.

In Column 13, Line 64, delete "communication node 20" and insert -- communication node --, therefor.

In the Claims

In Column 17, Line 16, in Claim 17, delete "or/and" and insert -- and/or --, therefor.

In Column 18, Line 37, in Claim 25, delete "selection" and insert -- selection, --, therefor.

Signed and Sealed this
Fourth Day of November, 2014

Michelle K. Lee
*Deputy Director of the United States Patent and Trademark Office*